(12) United States Patent
Potnuru et al.

(10) Patent No.: US 12,497,999 B2
(45) Date of Patent: Dec. 16, 2025

(54) BEARING LUBRICANT DRAIN

(71) Applicant: General Electric Company, Schenectady, NY (US)

(72) Inventors: Santosh Potnuru, Bengaluru (IN); Pradeep Hemant Sangli, Bengaluru (IN); Ravindra Shankar Ganiger, Bengaluru (IN); Souvik Math, Bengaluru (IN); Duane H. Anstead, Fairfield, OH (US); Matthew D. Brothers, Cincinnati, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 211 days.

(21) Appl. No.: 18/192,387

(22) Filed: Mar. 29, 2023

(65) Prior Publication Data
US 2024/0125356 A1   Apr. 18, 2024

(30) Foreign Application Priority Data

Oct. 17, 2022 (IN) .............................. 202211059249

(51) Int. Cl.
*F16C 33/66* (2006.01)
*F16C 19/06* (2006.01)

(52) U.S. Cl.
CPC .......... *F16C 33/6685* (2013.01); *F16C 19/06* (2013.01)

(58) Field of Classification Search
CPC .. F16C 19/06; F16C 33/6622; F16C 33/6685; F16C 33/6659; F16C 33/6681; F16C 2360/23
See application file for complete search history.

(56) References Cited

U.S. PATENT DOCUMENTS

| | | | | |
|---|---|---|---|---|
| 3,503,469 A | * | 3/1970 | Widder | F16N 7/00 184/5 |
| 3,836,215 A | * | 9/1974 | Dopkin | F16C 27/045 384/99 |
| 5,253,985 A | * | 10/1993 | Ruetz | F01D 25/18 384/473 |
| 5,749,660 A | * | 5/1998 | Dusserre-Telmon | F16C 19/166 384/475 |

(Continued)

FOREIGN PATENT DOCUMENTS

| FR | 3127024 A1 | 3/2023 |
|---|---|---|
| FR | 3127025 A1 | 3/2023 |

(Continued)

*Primary Examiner* — John Olszewski
*Assistant Examiner* — Aimee Tran Nguyen
(74) *Attorney, Agent, or Firm* — Venable LLP; Duarte Y Ho; Michele V. Frank

(57) ABSTRACT

A bearing assembly includes a bearing, an outer race located radially outward of the bearing and supporting the bearing, a bearing housing located radially outward of the outer race and supporting the bearing and the outer race, and a bearing lubricant drain including a multi-directional passage formed in one or both of the outer race or the bearing housing, the lubricant drain arranged to cause a lubricant to flow from a first location to a second location. The second location is radially outward and axially offset from the first location. A gas turbine engine includes a shaft configured to rotate about a centerline axis of the gas turbine engine and the bearing assembly configured to facilitate the rotation of the shaft.

20 Claims, 12 Drawing Sheets

(56) References Cited

U.S. PATENT DOCUMENTS

| | | | |
|---|---|---|---|
| 6,261,003 B1* | 7/2001 | Dusserre-Telmon | ... F16C 33/58 |
| | | | 384/475 |
| 6,837,623 B2 | 1/2005 | Shirokoshi et al. | |
| 8,562,224 B2 | 10/2013 | Duffy | |
| 8,979,383 B2 | 3/2015 | Carter et al. | |
| 9,033,581 B2 | 5/2015 | Carter et al. | |
| 9,841,056 B2 | 12/2017 | Snow et al. | |
| 10,753,400 B2* | 8/2020 | Duffy | ................. F16C 33/6659 |
| 2004/0022463 A1* | 2/2004 | Dusserre-Telmon | ........................ |
| | | | F16C 33/6685 |
| | | | 384/99 |
| 2013/0336608 A1* | 12/2013 | Miller | ................... F16C 33/585 |
| | | | 384/492 |
| 2015/0133261 A1* | 5/2015 | Dubey | ................. F16C 33/586 |
| | | | 384/473 |

FOREIGN PATENT DOCUMENTS

| | | |
|---|---|---|
| FR | 3129436 A1 | 5/2023 |
| FR | 3129690 A1 | 6/2023 |
| FR | 3130747 A1 | 6/2023 |
| FR | 3130874 A1 | 6/2023 |
| FR | 3130875 A1 | 6/2023 |
| FR | 3130877 A1 | 6/2023 |
| FR | 3130895 A1 | 6/2023 |
| WO | 2015067653 A1 | 5/2015 |

* cited by examiner

BEARING LUBRICANT DRAIN

CROSS REFERENCE TO RELATED APPLICATIONS

The present application claims the benefit of Indian Patent Application No. 202211059249, filed on Oct. 17, 2022, which is hereby incorporated by reference herein in its entirety.

TECHNICAL FIELD

The present disclosure relates generally to a bearing lubricant drain.

BACKGROUND

A turbine engine generally includes a fan and a core section arranged in flow communication with one another. The turbine engine includes bearing assemblies to facilitate rotation between relative parts. The bearing assemblies are lubricated to facilitate rotation of the bearing elements.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
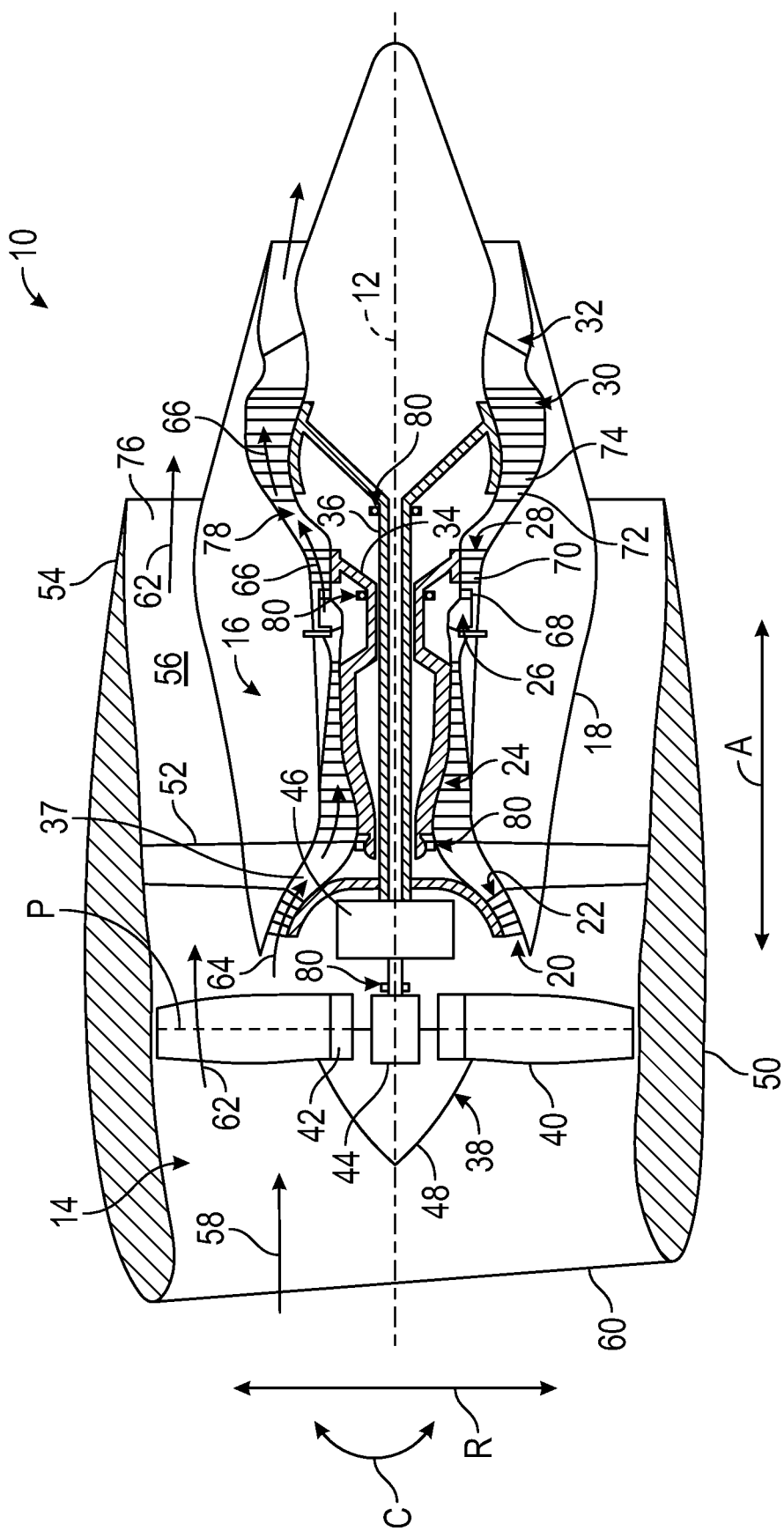
FIG. 1 is a schematic, cross-sectional view of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher," when applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

During engine operation, as described below, the low pressure shaft and the high pressure shaft rotate at high speeds and experience high axial loading. The high speeds and loads generate high bearing temperatures (e.g., greater than about 1000 BTU/minute) in the bearings that facilitate rotation of the shafts. That is, as the speed and/or the load on the shaft increases, the temperature of the bearing increases as well. The higher bearing temperatures require higher amounts of lubricant or oil to cool the bearings and the hardware located in and around a sump area (e.g., the forward cavity and the aft cavity surrounding the bearing assembly). The requirement for higher lubricant impacts heat load management of the engine since, for example, the required lubricant defines the lubricant line sizing and the heat exchanger sizing, among other components. Higher lubricant volumes required to cool the bearing assemblies also leads to increases in viscous heat generation in the bearings.

In order to maintain low temperatures and/or lower the temperatures at the bearings, while not increasing lubricant volumes, the lubricant drains of the present disclosure are provided in the bearing assemblies to remove lubricant from the bearing assemblies and allow for continuous and/or predetermined flows of lubricant through and past the bearing to remove heat therefrom. This allows for heat to be continuously or constantly taken from the bearing assembly and drained to one or more sumps or cavities in the system. By draining the lubricant from the bearing assemblies, the temperature of the bearings may be reduced, while not requiring larger lubricant lines and/or heat exchangers. Lubricant drains also reduce the viscous heat generation in the bearings by reducing the residence time of the lubricant within the bearing assembly.

A squeeze film damper is also included with the bearing assembly. Due to the inclusion of a damper housing for the squeeze film damper, the lubricant drains include passages that include multiple subsections to allow for drainage from the bearing to the forward cavity and/or the aft cavity. That is, the damper housing causes a radial constraint on the bearing such that a single drain hole in the outer race or the bearing housing is constrained by the damper housing, reducing the ability of the lubricant to be drained from the bearing assembly. Thus, the drains of the present disclosure are formed of multi-section passages navigating the lubricant from the bearing to the forward cavity and/or the aft cavity for drainage of the lubricant. As used herein, the terms forward cavity and aft cavity may also be referred to as sumps.

The lubricant drains of the present disclosure allow drained oil to circulate in a circumferential annular groove or passage, and angled or axial slots or passages on the bearing housing and/or the outer race, to enable the lubricant to exit the bearing assembly. In some examples, the lubricant drains include tangential and/or helical circumferential slots or passages and axial and circumferential slots in the bearing housing and/or the outer race to provide smoother exit for the lubricant exiting from the drain hole. In some examples, the lubricant drains include drain holes in the outer race that are included in the axial direction, and, in some further examples, are inclined in the circumferential direction. In some examples, a step or shoulder is provided on the bearing housing inner diameter and/or on the outer race outer diameter to provide a passage for the lubricant to exit the bearing assembly.

Accordingly, lubricant drains are provided in one or more components of the bearing assembly. For example, lubricant drains may be provided in the outer race of the bearing, the bearing housing, or both the outer race of the bearing and the bearing housing. The lubricant drains of the present disclosure reduce the viscous heat generation and allow draining of lubricant when there is a radial constraint (e.g., due to a squeeze film damper, which will be discussed in more detail below). The lubricant drains of the present disclosure reduce the heat generated by the bearing by about twenty percent to about thirty percent, inclusive of the end points. The lubricant drains of the present disclosure allow for reducing oil supply to the bearings, reducing the heat exchanger sizing, and reducing the supply line sizing, etc., as compared to bearing assemblies without lubricant drains.

FIG. 1 shows a schematic cross-sectional view of a gas turbine engine 10. The gas turbine engine 10 defines an axial direction A extending parallel to a longitudinal, centerline axis 12 of the gas turbine engine 10, a radial direction R, and a circumferential direction C extending about the axial direction A. The gas turbine engine 10 includes a fan section 14 and a core turbine engine 16 disposed downstream from the fan section 14.

The core turbine engine 16 depicted includes an outer casing 18 that defines an annular inlet 20. The core turbine engine 16 includes, in serial flow relationship, a compressor section including a low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. A high pressure (HP) shaft 34 drivingly connects the HP turbine 28 to the HP compressor 24. A low pressure (LP) shaft 36 drivingly connects the LP turbine 30 to the LP compressor 22. Accordingly, the LP shaft 36 and the HP shaft 34 are each rotary components, rotating about the longitudinal, centerline axis 12 in the circumferential direction C during operation of the gas turbine engine 10.

In order to support such rotary components, the gas turbine engine 10 includes a plurality of bearing assemblies 80 attached to various structural components within the gas turbine engine 10. For example, the bearing assemblies 80 may be located to facilitate rotation of the LP shaft 36 and the HP shaft 34. The bearing assemblies 80 may additionally, or alternatively, be located at any desired location along the LP shaft 36 and the HP shaft 34. The bearing assemblies 80 may be used in combination with oil-lubricated bearing assemblies, as will be discussed in more detail herein.

Referring still to FIG. 1, the fan section 14 includes a fan 38 having a plurality of fan blades 40 coupled to a disk 42 in a spaced apart manner. The disk 42 is covered by a hub 48. As depicted, the fan blades 40 extend radially outwardly from the disk 42 generally along the radial direction R. Each fan blade 40 is rotatable relative to the disk 42 about a pitch axis P by virtue of the fan blades 40 being operatively coupled to a pitch change mechanism 44. The fan blades 40, the disk 42, and the pitch change mechanism 44 are together rotatable about the longitudinal, centerline axis 12 by the LP shaft 36 across a power gearbox 46. The power gearbox 46 includes a plurality of gears for adjusting the rotational speed of the fan 38 relative to the LP shaft 36. More particularly, the fan section 14 includes a fan shaft rotatable by the LP shaft 36 across the power gearbox 46. Accordingly, the fan shaft may also be considered to be a rotary component, and is similarly supported by a bearing assembly 80.

The fan section 14 includes an annular fan casing or outer nacelle 50 that circumferentially surrounds the fan 38 and/or at least a portion of the core turbine engine 16. The outer nacelle 50 is supported relative to the core turbine engine 16 by a plurality of circumferentially-spaced outlet guide vanes 52. A downstream section 54 of the outer nacelle 50 extends over an outer portion of the core turbine engine 16 so as to define a bypass airflow passage 56 therebetween.

During operation of the gas turbine engine 10, a volume of air 58 enters the gas turbine engine 10 through an inlet 60 of the outer nacelle 50 and/or the fan section 14. As the volume of air 58 passes across the fan blades 40, a first portion of air 62 of the air 58 is directed or routed into the bypass airflow passage 56 and a second portion of air 64 of the air 58 is directed or routed into a core air flowpath 37, or, more specifically, into the LP compressor 22. The ratio between the first portion of air 62 and the second portion of air 64 is known as a bypass ratio. The pressure of the second portion of air 64 is then increased as it is routed through the high pressure (HP) compressor 24 and into the combustion section 26, where it is mixed with fuel and burned to generate combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before the first portion of air 62 is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

Although depicted and described in conjunction with the gas turbine engine 10 of FIG. 1, aspects of the present disclosure may be incorporated into any other suitable gas turbine engine. For example, in other exemplary embodiments, aspects of the present disclosure may be incorporated into, e.g., a turbo fan engine (e.g., similar to the gas turbine engine 10 of FIG. 1), a turboprop engine, a turboshaft engine, or a turbojet engine.

The gas turbine engine 10 depicted in FIG. 1 is by way of example only. In other exemplary embodiments, the gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines. Further, in still other embodiments, aspects of the present disclosure may be incorporated into any other suitable turbomachine, including, without limitation, a steam turbine, a centrifugal compressor, a turbocharger, stationary turbomachinery, or other power generation turbomachines, or any type of rotating equipment using squeeze film dampers.

FIGS. 2 to 15 illustrate enlarged views of bearing assemblies with different exemplary embodiments of a bearing lubricant drain, as will be described in more detail to follow. The bearing assemblies shown in FIGS. 2 to 15 may be any of the bearing assemblies 80 shown in FIG. 1. Features of any of the bearing lubricant drains of FIGS. 2 to 15 may be interchanged and/or combined with other embodiments of the bearing lubricant drain without departing from the scope of the present disclosure. The terms "slots," "channels," "grooves," "cutouts," "passages," and the like, are used interchangeably herein to refer to pathways or passages formed within the surface and/or wall of one or more components of the bearing assembly. In each of the embodiments described herein, the outer race and the bearing housing are each single, unitary, monolithic components. As mentioned above, the lubricant drains of FIGS. 2 to 15 account for the radial constraint of the damper housing. However, the lubricant drains may be employed in bearing assemblies that do not include a damper housing.

Figure 2:
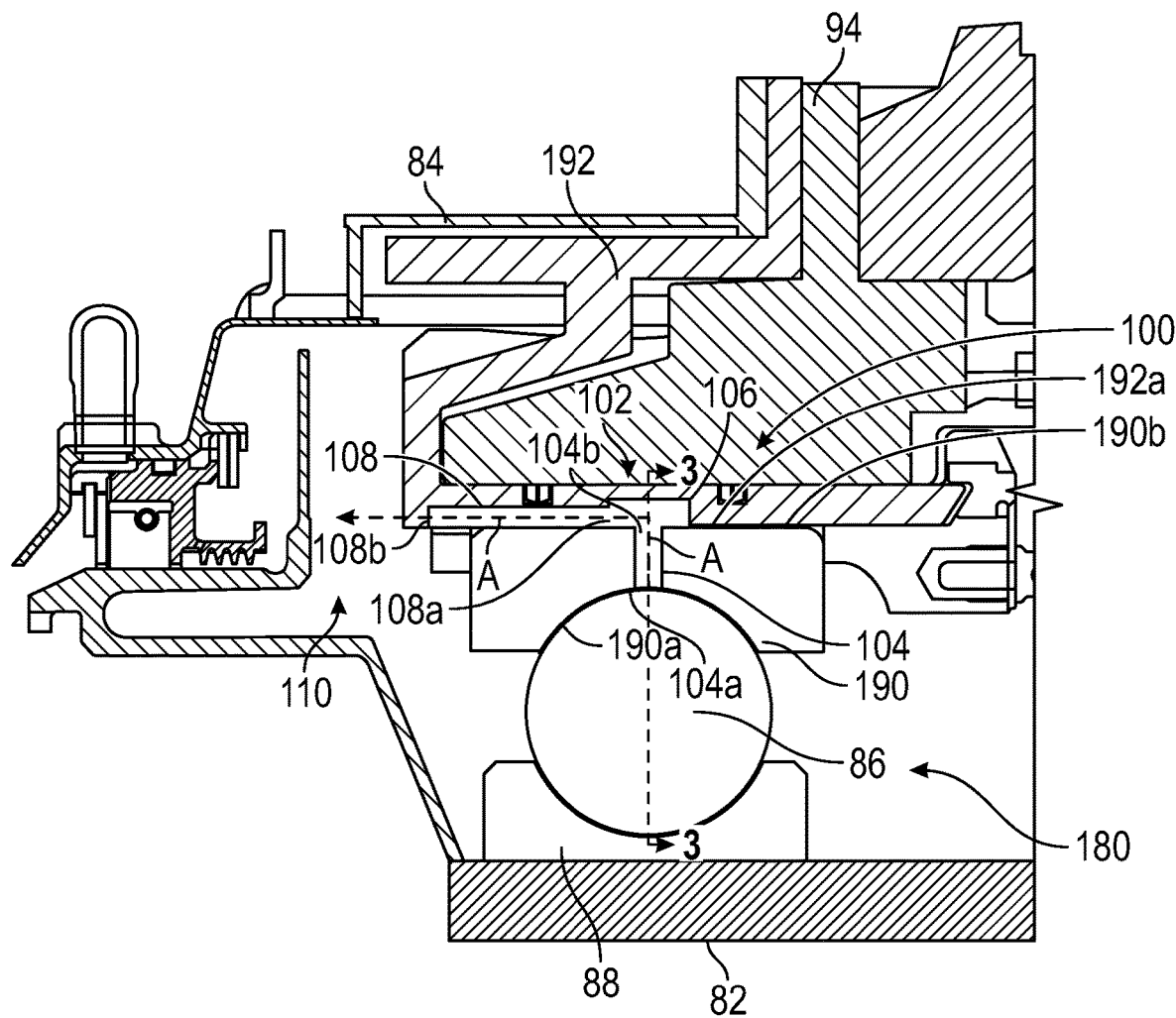
FIG. 2 is a schematic, cross-sectional view of a bearing assembly for the turbine engine of FIG. 1, the bearing assembly having a lubricant drain, according to the present disclosure.
Figure 3:
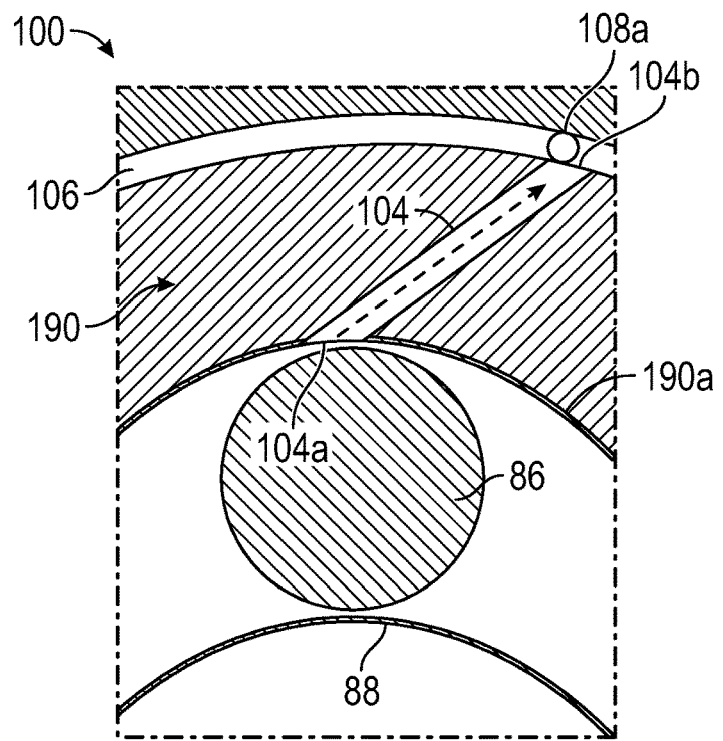
FIG. 3 is a schematic, cross-sectional view of the bearing assembly of FIG. 2, taken along the axis 3-3 in FIG. 2, according to the present disclosure.
Figure 4:
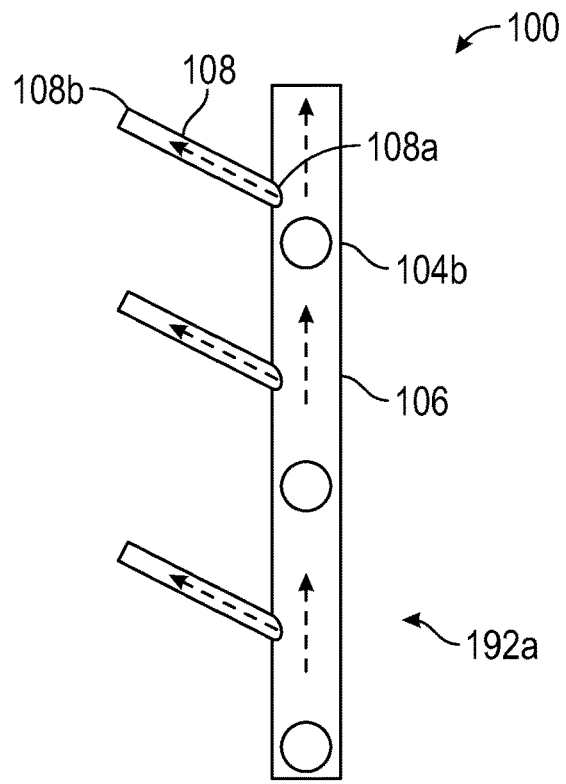
FIG. 4 is a schematic of a flow path of the lubricant drain of FIG. 2, according to the present disclosure.

FIGS. 2 to 4 illustrate an exemplary embodiment of a bearing lubricant drain 100. Referring to FIG. 2, a bearing assembly 180 may support rotation of a shaft 82 (which may be the HP shaft 34 and/or the LP shaft 36) with respect to another component 84 of the engine, such as described with respect to FIG. 1. The bearing assembly 180 includes a roller bearing 86, an inner race 88, an outer race 190, a bearing housing 192, a damper housing 94, and the bearing lubricant drain 100. The roller bearing 86 is supported within the inner race 88 and the outer race 190. The bearing assembly 180 may be coupled to the component 84 with the bearing housing 192. The bearing assembly 180 may be supplied with lubricant, such as oil, to facilitate rotation of the bearing assembly 180 within the inner race 88 and the outer race 190. The damper housing 94 is located radially outward of the bearing assembly 180 to provide a squeeze film damper (SFD) at the bearing assembly 180.

With continued reference to FIG. 2, the bearing lubricant drain 100 facilitates removal of lubricant from the bearing assembly 180. The bearing lubricant drain 100 includes a passage 102. The passage 102 includes one or more holes 104, a groove 106, and one or more slots 108. The one or more holes 104 are located in the outer race 190. Each hole 104 extends radially outward from a hole inlet 104a to a hole outlet 104b. The hole 104 extends radially outward from an inner surface 190a of the outer race 190 to an outer surface 190b of the outer race 190. Although a single hole 104 is shown in FIG. 2, multiple holes 104 may be provided in the outer race 190. The holes 104 may be uniformly or nonuniformly spaced around the circumference of the outer race 190.

The groove 106 is located in the bearing housing 192. The groove 106 is a groove formed in an inner surface 192a of the bearing housing 192. The groove 106 is an annular groove extending around the inner surface 192a about the centerline axis 12 (FIG. 1) The one or more slots 108 are located in the bearing housing 192. The one or more slots 108 are slots formed in the inner surface 192a of the bearing housing 192. Each slot 108 extends axially from an aft end to a forward end. Each slot 108 extends axially from a slot inlet 108a to a slot outlet 108b. Although a single slot 108 is shown in FIG. 2, multiple slots 108 may be provided in the bearing housing 192. The slots 108 may be uniformly or nonuniformly spaced around the circumference of the bearing housing 192 (for example, similar to the arrangement shown in FIG. 6).

FIG. 3 illustrates a partial cross-sectional view of the bearing assembly 180 and the bearing lubricant drain 100 taken through the axis 3-3 of FIG. 2. As shown in FIG. 3, the hole 104 is inclined in a circumferential direction from the hole inlet 104a to the hole outlet 104b. Thus, the hole 104 extends radially outward (as shown in FIG. 2) and extends at an angle in the circumferential direction (FIG. 3). Although the circumferential incline is shown at an angle of about forty-five degrees with respect to the centerline axis 12 (FIG. 1), other angles are contemplated.

FIG. 4 illustrates a plan view of the inner surface 192a of the bearing housing 192. As mentioned, the groove 106 is an annular groove that extends around the inner surface 192a. The groove 106 may extend three hundred and sixty degrees about the centerline axis 12 (FIG. 1) such that the groove 106 is circular in shape in a forward view or an aft end view. The slots 108 extend at an angle in the circumferential direction from the slot inlet 108a to the slot outlet 108b. Although the circumferential incline is shown at an angle of about forty-five degrees with respect to the centerline axis 12 (FIG. 1), other angles are contemplated. For example, the angle may be between about zero degrees and about eighty degrees with respect to the centerline axis 12. As shown, each hole outlet 104b is offset circumferentially from an adjacent slot inlet 108a. In some embodiments, the hole outlet 104b and the slot inlet 108a may be circumferentially aligned.

Accordingly, and referring to FIGS. 2 to 4, the bearing lubricant drain 100 allows for lubricant to flow through the bearing assembly 180 and to a forward cavity 110 (FIG. 2). Due to the radial constraint of the damper housing 94 (FIG. 2), the bearing lubricant drain 100 changes direction to deposit lubricant in the forward cavity 110. The overall trajectory of the bearing lubricant drain 100 is in the axial direction and the radial direction. That is, the inlet (e.g., hole inlet 104a) of the bearing lubricant drain 100 is radially inward and axially aft (also referred to as axially downstream) of the outlet (e.g., slot outlet 108b) of the bearing lubricant drain 100. The bearing lubricant drain 100 includes the passage 102 that is a multi-directional passage. That is, the passage 102 has a radially and circumferentially extending portion (e.g., hole 104), a circumferentially extending, annular portion (e.g., groove 106), and an axial and circumferentially extending portion (e.g., slot 108).

During operation, and referring to FIGS. 2 to 4, the lubricant is provided to the bearing assembly 180 in any manner. The lubricant facilitates rotation of the roller bearing 86. To enable lubricant to continually flow through the bearing assembly 180 and/or to allow used lubricant to flow from the bearing assembly 180, the bearing lubricant drain 100 provides passage 102 for the lubricant to flow from the bearing assembly 180 to the forward cavity 110 (FIG. 2) along the flow path A. The lubricant exits the bearing assembly 180 through the hole inlet 104a, travels through the hole 104 to the hole outlet 104b. From the hole outlet 104b, the lubricant enters the annular groove 106. Once in the annular groove 106, the lubricant may exit through one or more of the slots 108 and into the forward cavity 110.

Figure 5:
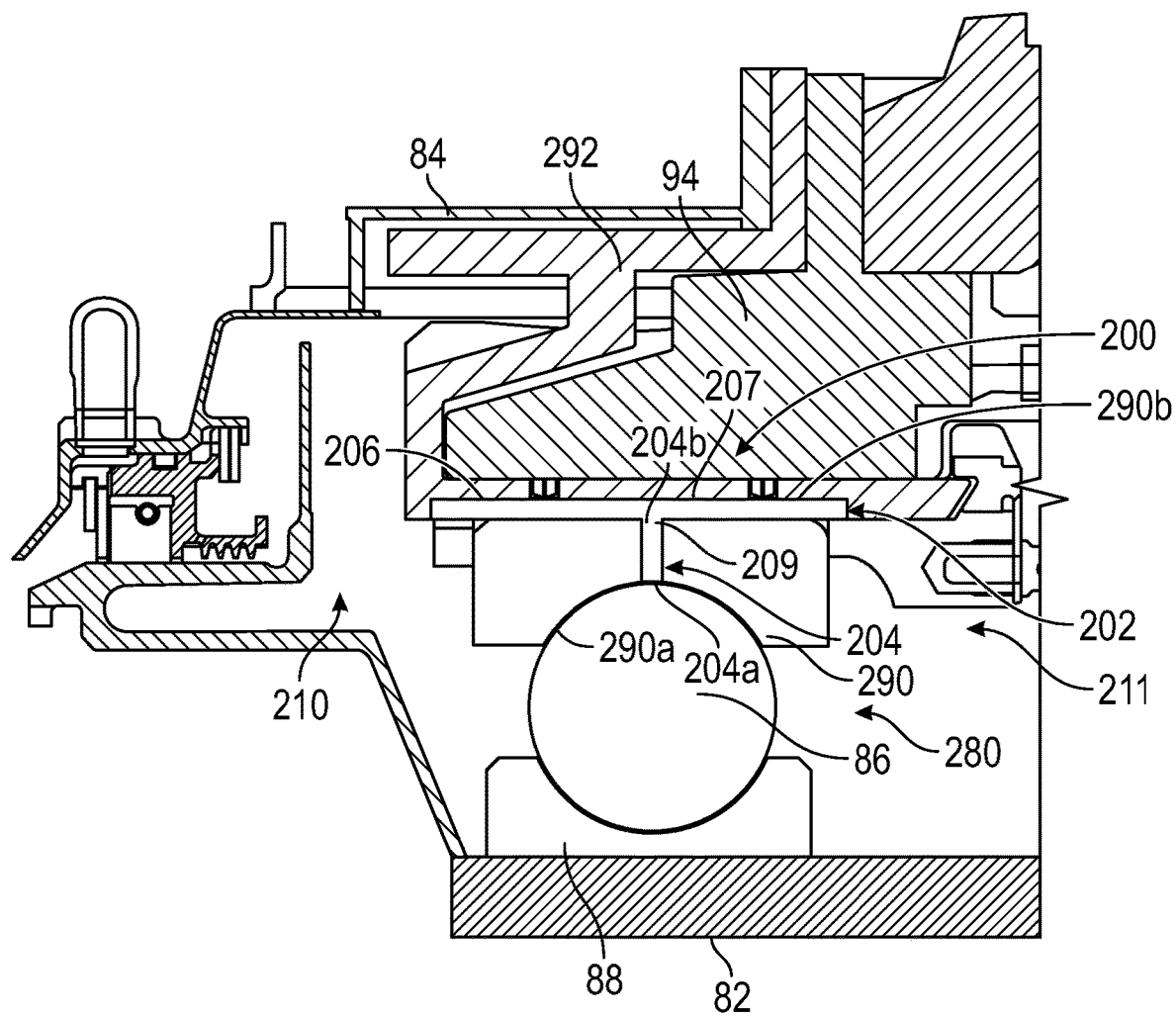
FIG. 5 is a schematic, cross-sectional view of a bearing assembly for the turbine engine of FIG. 1, the bearing assembly having a lubricant drain, according to the present disclosure.
Figure 6:
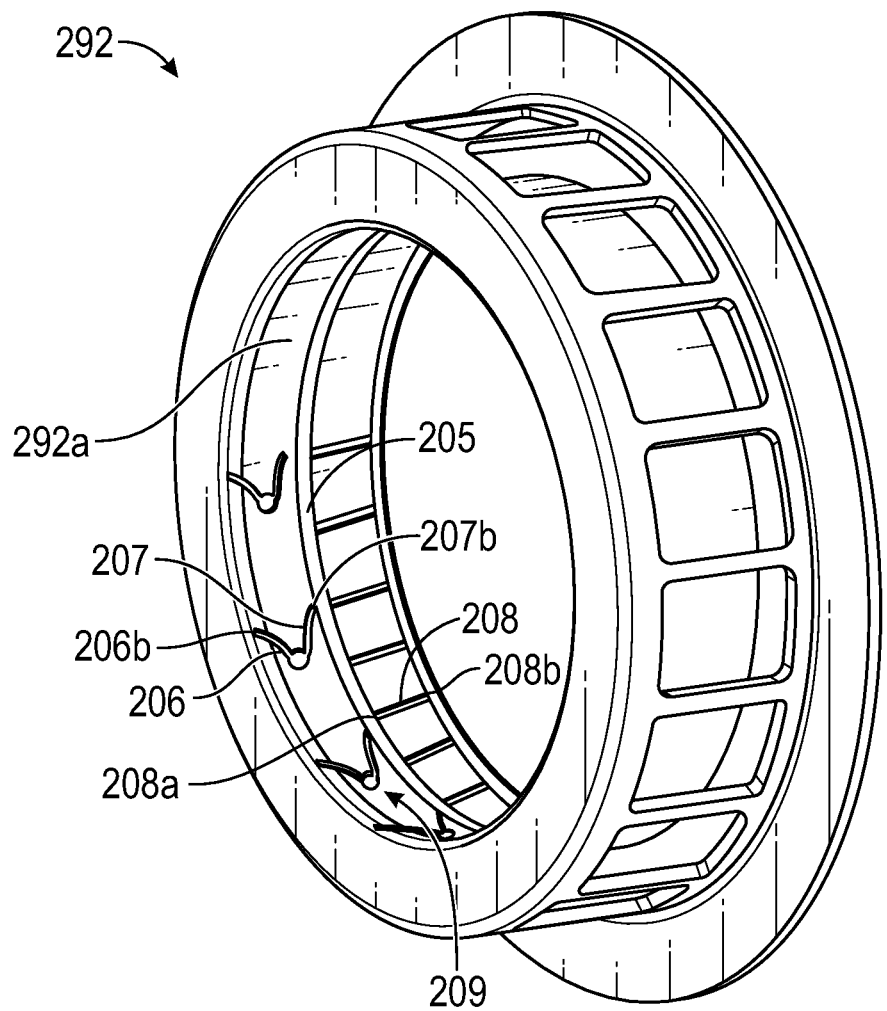
FIG. 6 is a schematic view of a bearing housing for the bearing assembly of FIG. 5, according to the present disclosure.

FIGS. 5 and 6 illustrate an exemplary embodiment of a bearing lubricant drain 200. The bearing lubricant drain 200 may be employed in a bearing assembly 280, which may be a bearing assembly 80 as described with respect to FIG. 1. Accordingly, like reference numerals in FIGS. 5 and 6 align with like reference numerals in FIGS. 1 to 4. The bearing lubricant drain 200 facilitates removal of lubricant from the bearing assembly 280. The bearing lubricant drain 200 includes a passage 202. The passage 202 includes one or more holes 204, one or more first slots 206, one or more second slots 207, and one or more cutouts 208 (FIG. 6). The one or more holes 204 are located in an outer race 290. Each hole 204 extends radially outward from a hole inlet 204a to a hole outlet 204b. The hole 204 extends radially outward from an inner surface 290a of the outer race 290 to an outer surface 290b of the outer race 290. Although a single hole 204 is shown in FIG. 5, multiple holes 204 may be provided circumferentially around the outer race 290. The holes 204 may be uniformly or nonuniformly spaced around the circumference of the outer race 290. As described with respect to hole 104 in FIG. 3, the hole 204 may be inclined in a circumferential direction from the hole inlet 204a to the hole outlet 204b. Thus, the hole 204 extends radially outward (as shown in FIG. 5) and extends at an angle in the circumferential direction.

The one or more first slots 206 and the one or more second slots 207 are located in a bearing housing 292. The one or more first slots 206 and the one or more second slots 207 are formed in an inner surface 292a of the bearing housing 292. As shown in FIG. 6, the one or more first slots 206 extend from a slot inlet 209 in an axially forward direction to a first slot outlet 206b. The one or more second slots 207 extend from the slot inlet 209 in an axially aft direction to a second slot outlet 207b. The one or more first slots 206 and the one or more second slots 207 extend at an angle in the circumferential direction from the slot inlet 209 to the respective first slot outlet 206b and the second slot outlet 207b. Although the circumferential incline is shown at an angle of about forty-five degrees with respect to the centerline axis 12 (FIG. 1), other angles are contemplated. For example, the angle may be between about zero degrees and about eighty degrees with respect to the centerline axis 12.

The one or more cutouts 208 are located in the bearing housing 292. The cutouts 208 are formed in an inner surface 292a of the bearing housing 292. As shown in FIG. 6, the cutouts 208 extend axially from an axially forward cutout inlet 208a to an axially aft cutout outlet 208b. A groove 205 is located between the second slot outlet 207b and the cutout inlet 208a. The groove 205 may be a circumferential groove formed in the inner surface 292a of the bearing housing 292. The groove 205 may facilitate flow of the lubricant from the second slots 207 to the axial cutouts 208. Although the cutouts 208 are illustrated as extending axially, with no inclination in the circumferential direction, the cutouts 208 may be inclined circumferentially in a manner similar to the one or more first slots 206 and the one or more second slots 207. The first slots 206 and the second slots 207 may be tangential channels. That is, the slots may be arranged tangential to the inner surface of the bearing housing 292.

Accordingly, and referring to FIGS. 5 and 6, the bearing lubricant drain 200 allows for lubricant to flow through the bearing assembly 280 and to a forward cavity 210 and an aft cavity 211. Due to the radial constraint of the damper housing 94, the bearing lubricant drain 200 changes direction to deposit lubricant in the forward cavity 210 and the aft cavity 211. The overall trajectory of the bearing lubricant drain 200 is in the axial direction and the radial direction. That is, the inlet of the bearing lubricant drain 200 is radially inward and axially aft (also referred to as axially downstream) of the outlet of the bearing lubricant drain 200 to the forward cavity 210 and is radially inward and axially forward (also referred to as axially upstream) of the outlet of the bearing lubricant drain to the aft cavity 211. The bearing lubricant drain 200 includes a passage 202 that is a multi-directional passage. That is, the passage 202 has a radially and circumferentially extending portion (e.g., hole 204), an axially forward, circumferentially extending portion (e.g., first slot 206), an axially aft, circumferentially extending portion (e.g., second slot 207), and an axially aft extending portion (e.g., cutout 208).

During operation, and referring to FIGS. 5 and 6, the lubricant is provided to the bearing assembly 280 in any manner. The lubricant facilitates rotation of the roller bearing 86. To enable lubricant to continually flow through the bearing assembly 280 and/or to allow used lubricant to exit from the bearing assembly 280, the bearing lubricant drain 200 provides the passage 202 for the lubricant to flow from the bearing assembly 280 to the forward cavity 210 (FIG. 5) and the aft cavity 211 (FIG. 5). The lubricant exits the bearing assembly 280 through the hole inlet 204a, travels through the hole 204 to the hole outlet 204b. From the hole outlet 204b, the lubricant enters the first slot 206 and the second slot 207 via the slot inlet 209. Some or all of the lubricant may flow through the first slot 206 to the first slot outlet 206b and into the forward cavity 210. Some or all of the lubricant may flow through the second slot 207 to the second slot outlet 207b and into the cutout 208 to the cutout outlet 208b, and into the aft cavity 211.

Figure 7:
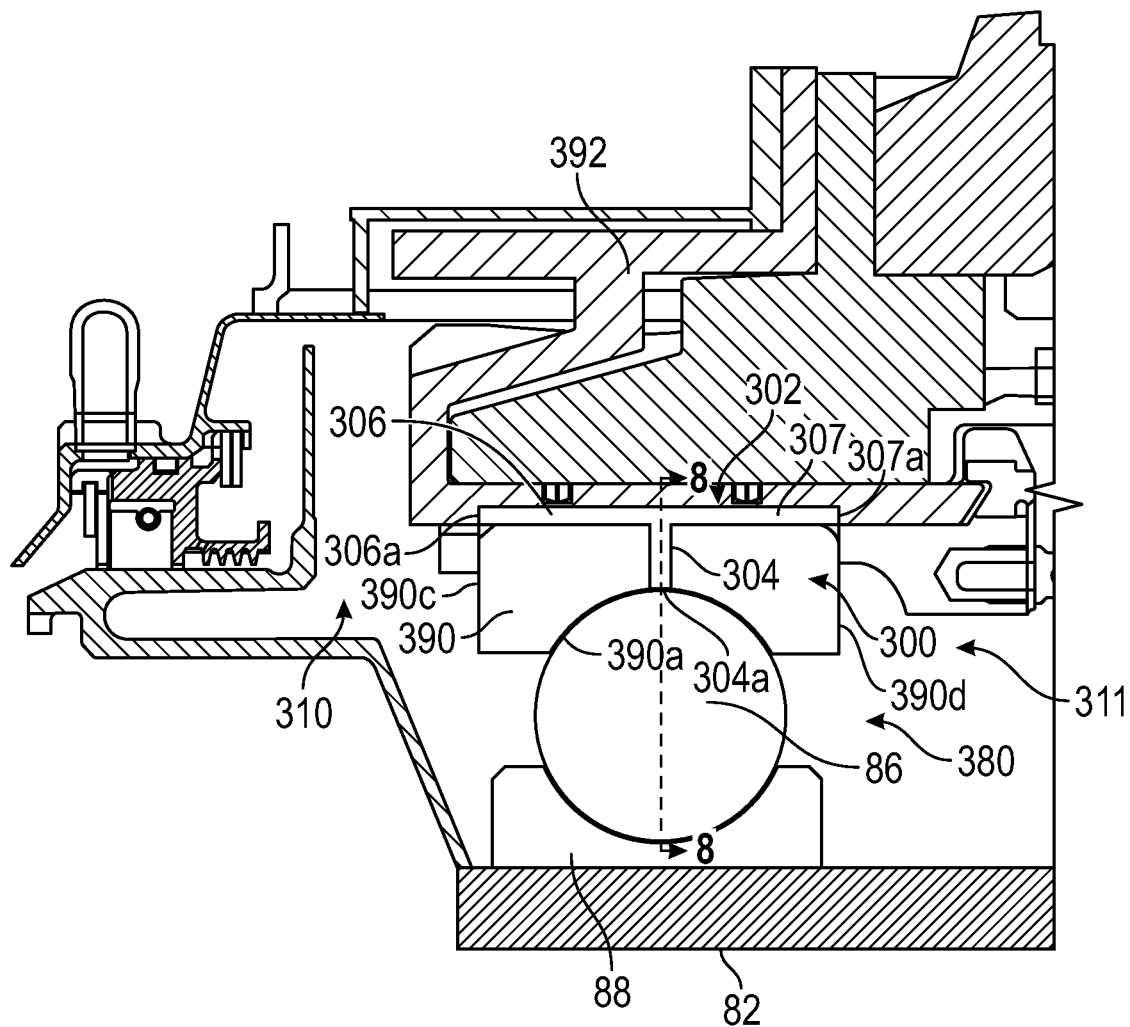
FIG. 7 is a schematic, cross-sectional view of a bearing assembly for the turbine engine of FIG. 1, the bearing assembly having a lubricant drain, according to the present disclosure.
Figure 8:
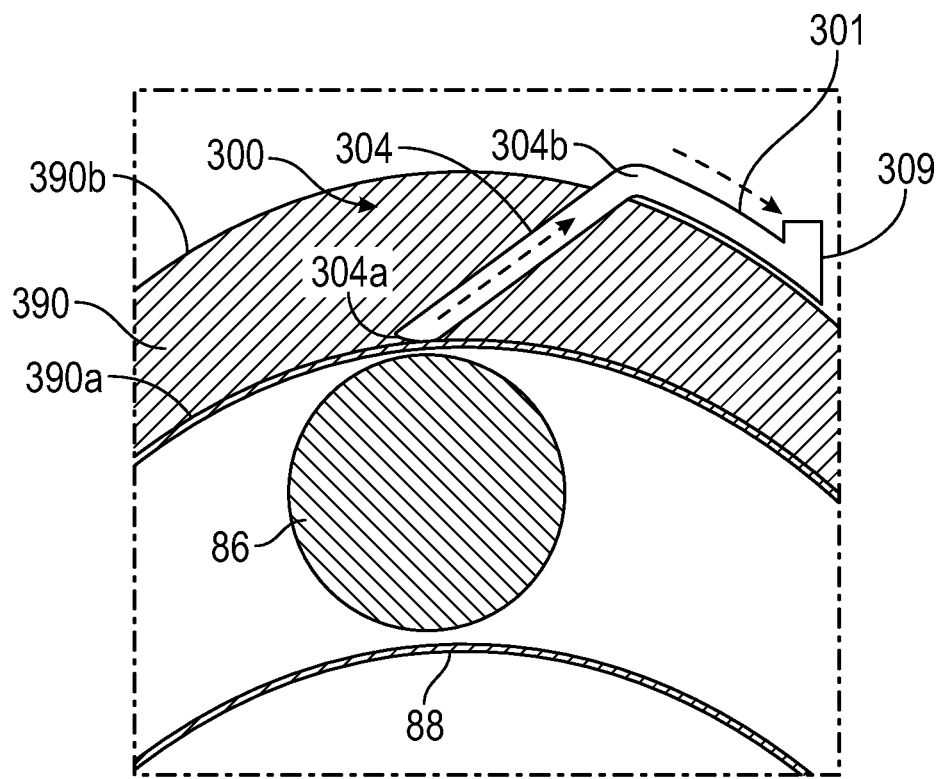
FIG. 8 is a schematic, cross-sectional view of the bearing assembly of FIG. 7, taken along the axis 8-8 in FIG. 7, according to the present disclosure.
Figure 9:
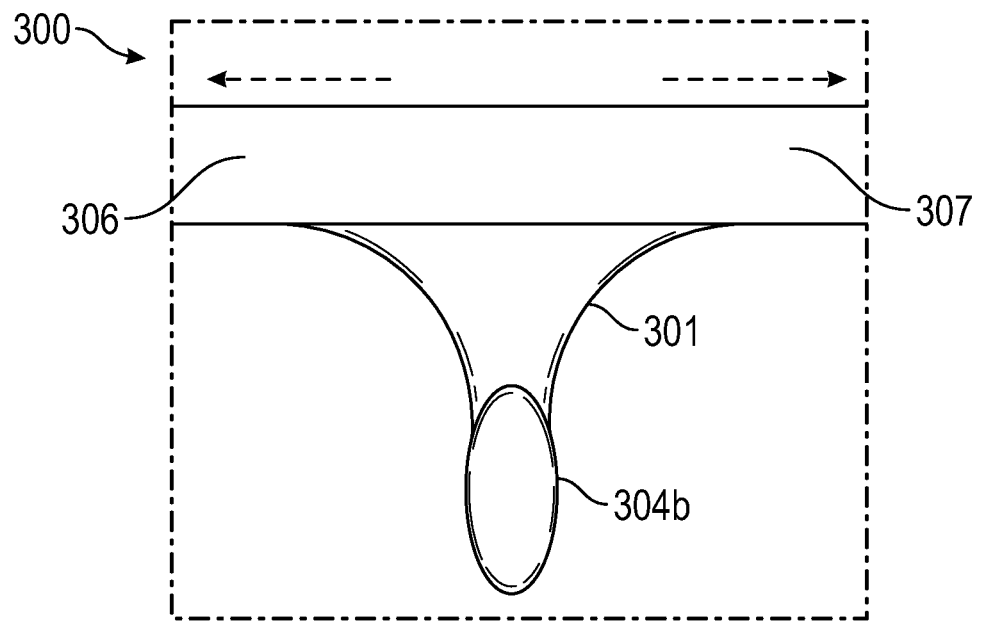
FIG. 9 is a schematic view of a flow path of the lubricant drain of FIG. 7, according to the present disclosure.

FIGS. 7 to 9 illustrate exemplary embodiments of a bearing lubricant drain 300. The bearing lubricant drain 300 may be employed in a bearing assembly 380, which may be a bearing assembly as described with respect to FIG. 1. Accordingly, like reference numerals in FIGS. 7 to 9 align with like reference numerals in FIGS. 1 to 6. The bearing lubricant drain 300 facilitates removal of lubricant from the bearing assembly 380. The bearing lubricant drain 300 includes a passage 302. The passage 302 includes one or more holes 304, one or more first slots 306, and one or more second slots 307. Although not shown, axial cutouts similar to, or the same as, cutouts 208 may be provided in the same manner as described with respect to FIGS. 5 and 6.

FIGS. 8 and 9 further illustrate the similarities and differences between the passage 302 shown in FIGS. 7 to 9, the passage 202 shown in FIGS. 5 and 6, and the passage 102 shown in FIGS. 2 to 4. For example, in FIG. 8, the hole 304 (located in an outer race 390) is angled radially outward and circumferentially from a hole inlet 304a to a hole outlet 304b (similar to the hole 104 shown in FIG. 3). However, the passage 302 (FIG. 7) also includes a groove 301 on the outer surface 390b of the outer race 390. The groove 301 leads to a slot inlet 309 of the one or more first slots 306 and the one or more second slots 307 (located in a bearing housing 392 (FIG. 7)). As shown in FIG. 7, the one or more first slots 306 may exit to a forward cavity 310 and the one or more second slots 307 may exit to an aft cavity 311 (and, thus, although not illustrated in FIGS. 7 to 9, cutouts may be provided similar to cutouts 208 (FIG. 6)). Accordingly, any of the features and/or variations or modifications described with respect to FIGS. 2 to 6 are applicable to those shown in FIGS. 7 to 9.

The slots formed in the bearing housing 392 (e.g., the first slot 306 and the second slot 307, together) have a width (e.g., distance from an axially forwardmost end 306a to an axially aftmost end 307a) that is equal to the width (e.g., distance from an axially forwardmost end 390c to an axially aftmost end 390d) of the outer race 390. The groove 301 formed in the outer race 390 leads from the hole 304 to the slots formed in the bearing housing 392. In some examples, the groove 301 may be formed on the inner surface of the bearing housing 392.

Accordingly, and referring to FIGS. 7 to 9, the bearing lubricant drain 300 allows for lubricant to flow through the bearing assembly 380 and to the forward cavity 310 and the aft cavity 311. Due to the radial constraint of the damper housing 94, the bearing lubricant drain 300 changes direction to deposit lubricant in the forward cavity 310 and the aft cavity 311. The overall trajectory of the bearing lubricant drain 300 is in the axial direction and the radial direction. That is, the inlet (e.g., hole inlet 304a) of the bearing lubricant drain 300 is radially inward and axially aft (also referred to as axially downstream) of the outlet (e.g., outlet of first slot 306) of the bearing lubricant drain 300 to the forward cavity 310 and is radially inward and axially forward (also referred to as axially upstream) of the outlet (e.g., outlet of second slot 307) of the lubricant drain to the aft cavity 311. The bearing lubricant drain 300 includes a passage 302 that is a multi-directional passage. That is, the passage 302 has a radially and circumferentially extending portion (e.g., hole 304), a circumferentially extending portion (e.g., groove 301), an axially forward, circumferentially extending portion (e.g., first slot 306), and an axially aft, circumferentially extending portion (e.g., second slot 307).

During operation, and referring to FIGS. 7 to 9, the lubricant is provided to the bearing assembly 380 in any manner. The lubricant facilitates rotation of the roller bearing 86. To enable lubricant to continually flow through the bearing assembly 380 and/or to allow used lubricant to exit from the bearing assembly 380, the bearing lubricant drain 300 provides the passage 302 for the lubricant to flow from the bearing assembly 380 to the forward cavity 310 (FIG. 7) and the aft cavity 311 (FIG. 7). The lubricant exits the bearing assembly 380 through the hole inlet 304a, travels through the hole 304 to the hole outlet 304b. From the hole outlet 304b, the lubricant flows through the groove 301 and enters the first slot 306 and the second slot 307 via the slot inlet 309. Some or all of the lubricant may flow through the first slot 306 to the forward cavity 310. Some or all of the lubricant may flow through the second slot 307 to the aft cavity 311 (via the optional axial cutout).

Figure 10:
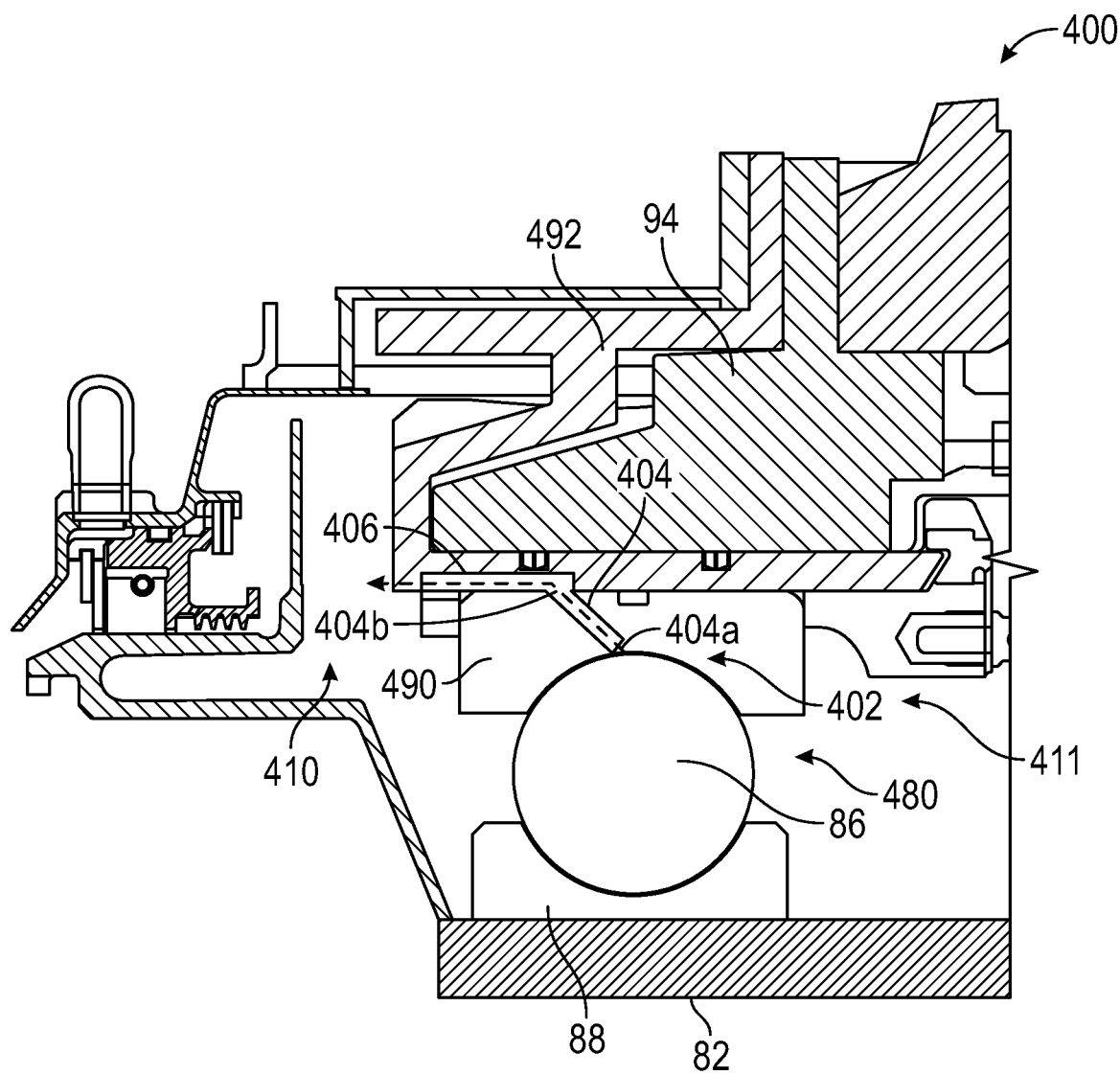
FIG. 10 is a schematic, cross-sectional view of a bearing assembly for the turbine engine of FIG. 1, the bearing assembly having a lubricant drain, according to the present disclosure.

FIG. 10 illustrates an exemplary embodiment of a bearing lubricant drain 400. The bearing lubricant drain 400 may be employed in a bearing assembly 480, which may be a bearing assembly 80 as described with respect to FIG. 1. Accordingly, like reference numerals in FIG. 10 align with like reference numerals in FIGS. 1 to 9. The bearing lubricant drain 400 facilitates removal of lubricant from the bearing assembly 480. The bearing lubricant drain 400 includes a passage 402. The passage 402 includes one or more holes 404 and one or more slots 406.

FIG. 10 further illustrates the similarities and differences between the passage 402 shown in FIG. 10 and the passage 102 shown in FIGS. 2 to 4. For example, in FIG. 10, the hole 404 (located in an outer race 490) is angled radially outward from a hole inlet 404a to a hole outlet 404b (similar to the hole 104 of FIG. 3). However, the hole 404 is also angled axially from the hole inlet 404a to the hole outlet 404b. This is different than that shown in FIG. 3, where the hole 104 extends in a purely radially direction with no axial inclination. As shown in FIG. 10, the hole outlet 404b leads to the slot 406 and exits to a forward cavity 410. Accordingly, any of the features and/or variations or modifications described with respect to FIGS. 2 to 9 are applicable to that shown in FIG. 10. In some examples, the slot 406 may be a plurality of discrete slots formed on the inner surface of a bearing housing 492. In some examples, the slot 406 may be a continuous annular groove formed on the inner surface of the bearing housing 492.

Accordingly, the bearing lubricant drain 400 allows for lubricant to flow through the bearing assembly 480 and to the forward cavity 410. Due to the radial constraint of the damper housing 94, the bearing lubricant drain 400 changes direction to deposit lubricant in the forward cavity 410. The overall trajectory of the bearing lubricant drain 400 is in the axial direction and the radial direction. That is, the inlet (e.g., hole inlet 404a) of the bearing lubricant drain 400 is radially inward and axially aft (also referred to as axially downstream) of the outlet of the bearing lubricant drain 400. The bearing lubricant drain 400 includes a passage 402 that is multi-directional. That is, the passage 402 has a radially, axially, and circumferentially extending portion (e.g., hole 404) and an axial and circumferentially extending portion (e.g., slot 406).

During operation, and referring to FIG. 10, the lubricant is provided to the bearing assembly 480 in any manner. The lubricant facilitates rotation of the roller bearing 86. To enable lubricant to continually flow through the bearing assembly 480 and/or to allow used lubricant to flow from the bearing assembly 480, the bearing lubricant drain 400 provides a passage 402 for the lubricant to flow from the bearing assembly 480 to the forward cavity 410. The lubricant exits the bearing assembly 480 through the hole inlet 404a, travels through the hole 404 to the hole outlet 404b. From the hole outlet 404b, the lubricant flows through the slot 406 and to the forward cavity 410. Although not illustrated, axial cutouts may be provided to allow lubricant to cause lubricant to flow to an aft cavity 411.

Figure 11:
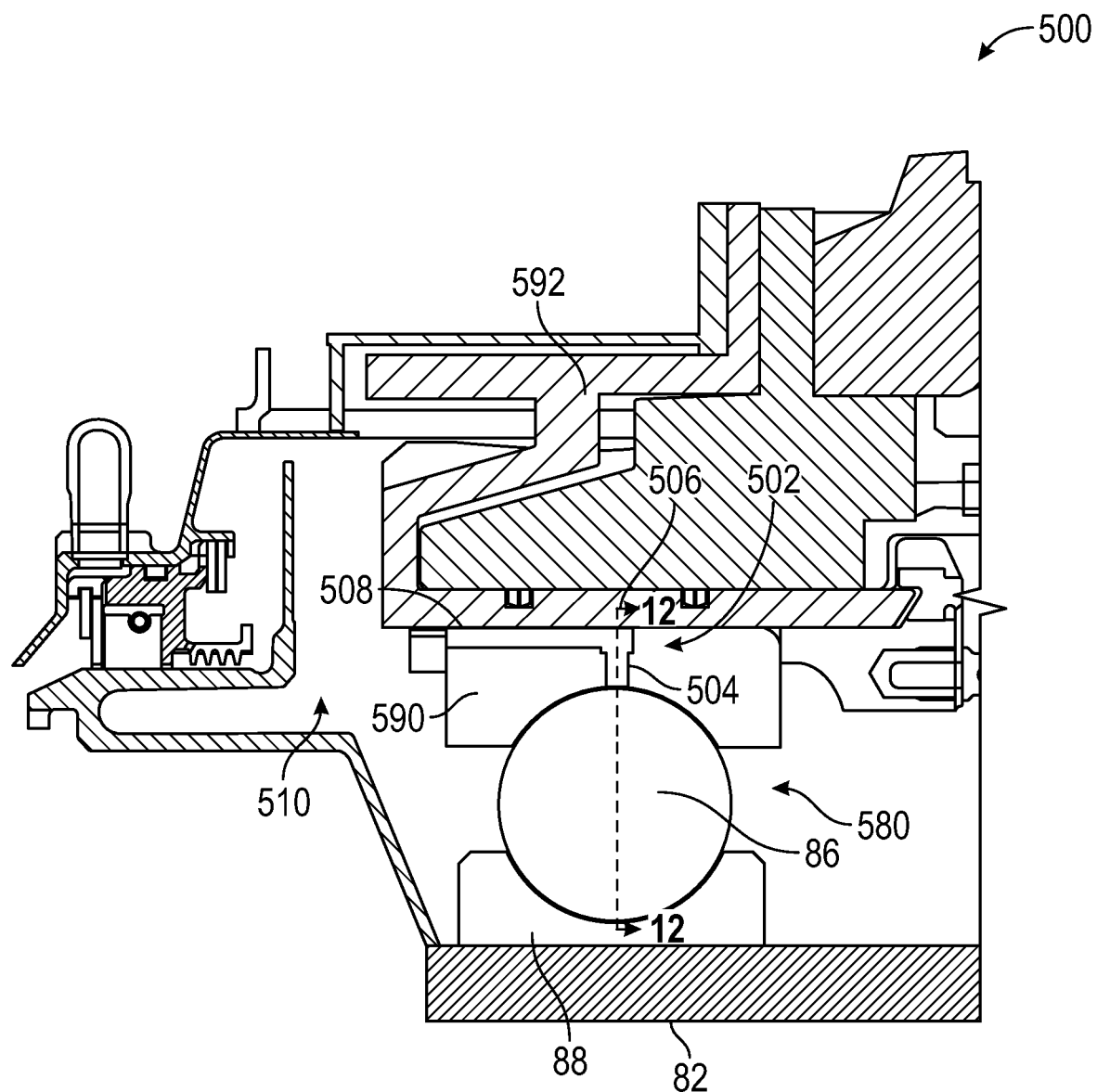
FIG. 11 is a schematic, cross-sectional view of a bearing assembly for the turbine engine of FIG. 1, the bearing assembly having a lubricant drain, according to the present disclosure.
Figure 12:
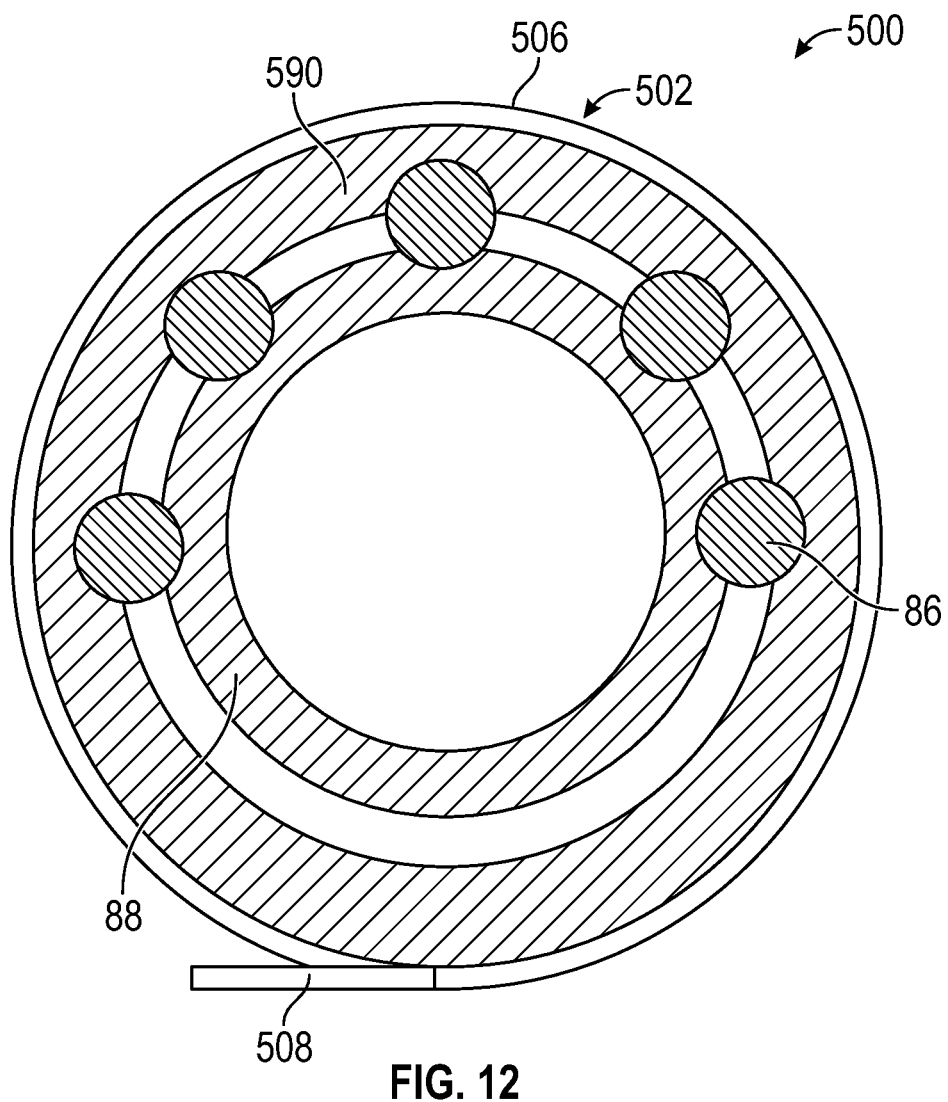
FIG. 12 is a schematic, cross-sectional view of the bearing assembly of FIG. 11, taken along the axis 12-12 in FIG. 11, according to the present disclosure.

FIGS. 11 and 12 illustrate an exemplary embodiment of a bearing lubricant drain 500. The bearing lubricant drain 500 may be employed in a bearing assembly 580, which may be a bearing assembly as described with respect to FIG. 1. Accordingly, like reference numerals in FIGS. 11 and 12 align with like reference numerals in FIGS. 1 to 10. The bearing lubricant drain 500 facilitates removal of lubricant from the bearing assembly 580. The bearing lubricant drain 500 includes a passage 502. The passage 502 includes one or more holes 504, a gutter 506 (FIG. 12), and one or more slots 508. The one or more holes 504, the gutter 506, and the one or more slots 508 may each be formed in an outer race 590 of the bearing assembly 580. A bearing housing 592 is provided around the outer race 590.

As illustrated in FIG. 12, the gutter 506 may be circular in cross section. The gutter 506 may extend completely around the outer race 590. The gutter 506 may be, for example, a groove or a passage formed directly in an outer surface of the outer race 590. In some examples, the gutter 506 may be a separate structure (e.g., a duct, a pipe, or a tube) coupled to the outer race 590. As further shown in FIG. 12, the one or more slots 508 may be located at a six o'clock position, or about at a six o'clock position, with respect to the bearing outer race 590. The six o'clock position may be defined at a vertically lower end or bottom of the outer race 590 when viewing the engine from a forward direction to an aft direction. The one or more slots 508 are located at, near, or around the six o'clock position to take advantage of gravity to assist the flow of the lubricant from the gutter 506 into the one or more slots 508 and into a forward cavity 510 (FIG. 11). The one or more holes 504 (FIG. 11) and/or the one or more slots 508 may take the form of any of the holes, slots, passages, or grooves described herein. In some examples, the one or more slots 508 are presented as the one or more slots 608 described with respect to FIG. 14. Although not shown, axial cut outs (e.g., akin to cutouts 607 in FIG. 14) may be provided.

Accordingly, and referring to FIGS. 11 and 12, the bearing lubricant drain 500 allows for lubricant to flow through the bearing assembly 580 and to the forward cavity 510. Due to the radial constraint of the damper housing 94, the bearing lubricant drain 500 changes direction to deposit lubricant in the forward cavity 510. The overall trajectory of the bearing lubricant drain 500 is in the axial direction and the radial direction. That is, the inlet of the bearing lubricant drain 500 is radially inward and axially aft (also referred to as axially downstream) of the outlet of the bearing lubricant drain 500. The bearing lubricant drain 500 includes the passage 502 that is a multi-directional passage. That is, the passage 502 has a radially and circumferentially extending portion (e.g., hole 504), a circumferentially extending, annular portion (e.g., gutter 506), and an axial and circumferentially extending portion (e.g., slot 508).

During operation, and referring to FIGS. 11 and 12, the lubricant is provided to the bearing assembly 580 in any manner. The lubricant facilitates rotation of the roller bearing 86. To enable lubricant to continually flow through the bearing assembly 580 and/or to allow used lubricant to flow from the bearing assembly 580, the bearing lubricant drain 500 provides a passage 502 for the lubricant to flow from the bearing assembly 580 to the forward cavity 510. The lubricant exits the bearing assembly 580 through the hole inlet, travels through the hole 504 to the hole outlet. From the hole outlet, the lubricant flows through the gutter 506. The lubricant flows within the gutter 506 toward the six o'clock position. This may be accomplished by, or assisted by, gravity. As the lubricant flows toward the six o'clock position, the lubricant flows into the one or more slots 508, which then empty the lubricant into the forward cavity 510. In examples where axial cut outs are provided, these may also be provided at or near the six o'clock position for emptying the lubricant to an aft cavity of the bearing assembly 580.

Figure 13:
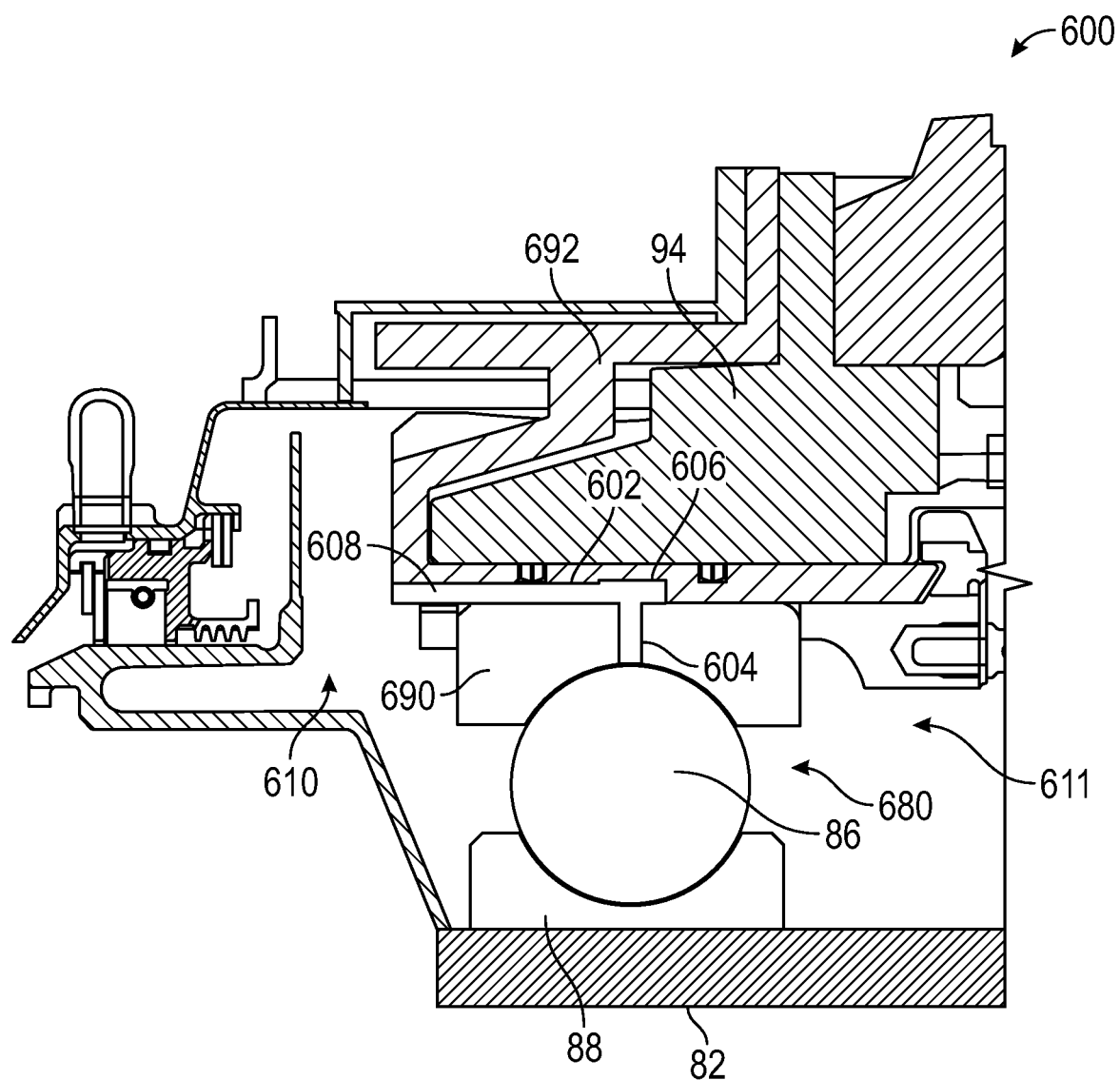
FIG. 13 is a schematic, cross-sectional view of a bearing assembly for the turbine engine of FIG. 1, the bearing assembly having a lubricant drain, according to the present disclosure.
Figure 14:
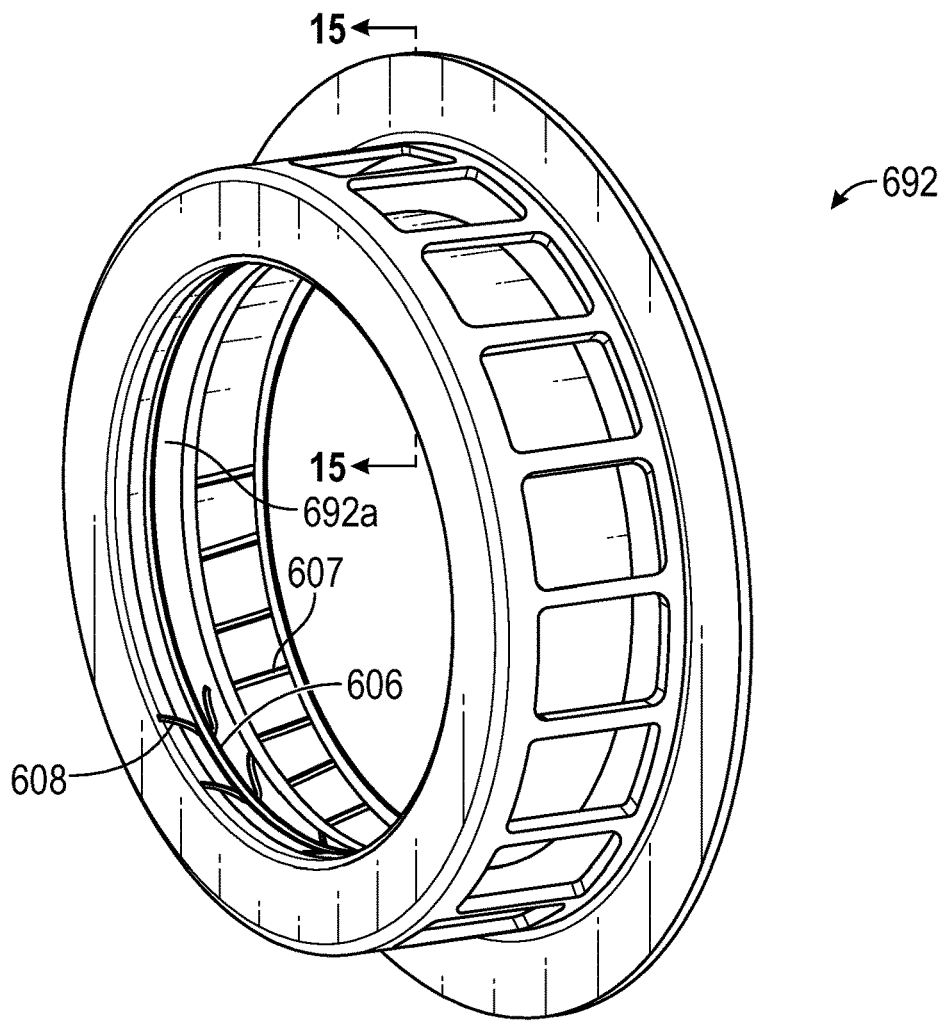
FIG. 14 is a schematic view of a bearing housing for the bearing assembly of FIG. 13, according to the present disclosure.
Figure 15:
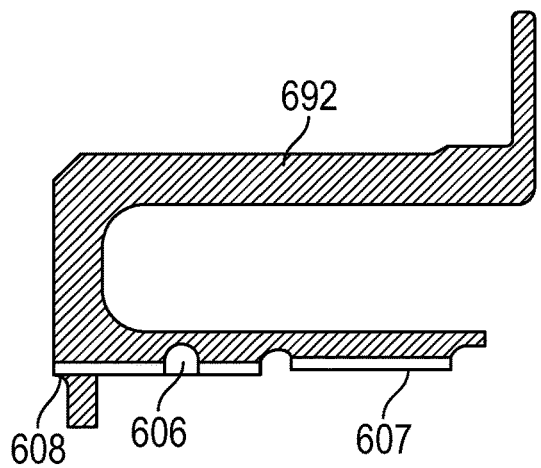
FIG. 15 is a schematic, cross-sectional view of the bearing housing of FIG. 14, taken along the axis 15-15 in FIG. 14, according to the present disclosure.

FIGS. 13 to 15 illustrate an exemplary embodiment of a bearing lubricant drain 600. The bearing lubricant drain 600 may be employed in a bearing assembly 680, which may be a bearing assembly as described with respect to FIG. 1. Accordingly, like reference numerals in FIGS. 13 to 15 align with like reference numerals in FIGS. 1 to 12. The bearing lubricant drain 600 facilitates removal of lubricant from the bearing assembly 680. The bearing lubricant drain 600 includes a passage 602. The passage 602 includes one or more holes 604, a gutter 606, one or more slots 608, and one or more cutouts 607.

The one or more holes 604 are formed in an outer race 690 of the bearing assembly 680. The gutter 606, the one or more slots 608, and the cutouts 607 are each be formed in a bearing housing 692. As illustrated in FIGS. 14 and 15, the gutter 606 may be a groove or a passage on an inner surface 692a of the bearing housing 692. The one or more slots 608 and the one or more cutouts 607 are also formed on the inner surface 692a of the bearing housing 692. The one or more slots 608 and the one or more cutouts 607 may each be located near the six o'clock position, for example, between about the five o'clock position and the seven o'clock position. In this manner, lubricant flowing through the gutter 606 may be directed to the bottom of the gutter 606 (e.g., due to gravity) and then may be directed to a respective forward cavity 610 and aft cavity 611 (FIG. 13).

As illustrated in FIG. 14, the gutter 606 may be circular in cross section. The gutter 606 may extend completely around the inner surface 692a of the bearing housing 692. The gutter 606 may be, for example, a groove or a passage formed directly in the inner surface 692a. In some examples, the gutter 606 may be a separate structure (e.g., a duct, a pipe, or a tube) coupled to the bearing housing 692. The one or more holes 604, the one or more slots 608, and/or the one or more cutouts 607 may take the form of any of the holes, slots, passages, grooves, or cutouts described herein. In some examples, the cutouts 607 are axial cutouts. In some examples, the one or more slots 608 extend in an axial and circumferential direction with respect to the engine centerline.

Accordingly, and with reference to FIGS. 13 and 14, the bearing lubricant drain 600 allows for lubricant to flow through the bearing assembly 680 and to the forward cavity 610. Due to the radial constraint of the damper housing 94, the bearing lubricant drain 600 changes direction to deposit lubricant in the forward cavity 610. The overall trajectory of the bearing lubricant drain 600 is in the axial direction and the radial direction. That is, the inlet of the bearing lubricant drain 600 is radially inward and axially aft (also referred to as axially downstream) of the outlet of the bearing lubricant drain 600. The bearing lubricant drain 600 includes a passage 602 that is a multi-directional passage. That is, the passage 602 has a radially and circumferentially extending portion (e.g., a hole 604), a circumferentially extending, annular portion (e.g., a gutter 606), and an axial and circumferentially extending portion (e.g., slot 608).

During operation, and referring to FIGS. 13 to 15, the lubricant is provided to the bearing assembly 80 in any manner. The lubricant facilitates rotation of the roller bearing 86. To enable lubricant to continually flow through the bearing assembly 680 and/or to allow used lubricant to exit from the bearing assembly 680, the bearing lubricant drain 600 provides a passage 602 for the lubricant to flow from the bearing assembly 680 to the forward cavity 610. The lubricant exits the bearing assembly 680 through the hole inlet, and travels through the hole 604 to the hole outlet. From the hole outlet, the lubricant flows through the gutter 606. The lubricant flows within the gutter 606 toward the six o'clock position. This may be accomplished by, or assisted by, gravity. As the lubricant flows toward the six o'clock position, the lubricant flows into the one or more slots 608 which then empty the lubricant into the forward cavity 610 and into the one or more cutouts 607 into the aft cavity 611.

Referring back to FIGS. 11 and 13, the bearing lubricant drain 500 (FIG. 11) and the bearing lubricant drain 600 (FIG. 13) each include a gutter (e.g., gutter 506 and gutter 606). The gutters have an axial width (e.g., a width extending along the axial direction) that changes from the twelve o'clock position to the six o'clock position. The twelve o'clock position may be defined at a vertically upper end or top of the outer race 590, 690 when viewing the engine from a forward direction to an aft direction. The gutter 506, 606 widens from at, near, or around the twelve o'clock position to at, near, or around the six o'clock position. The widening of the gutter 506, 606 from the twelve o'clock position to the six o'clock position encourages drainage of the lubricant toward the slots 508 and the slots 608. The gutter width increases from about fifty percent to about one hundred percent, inclusive of the end points, from the twelve o'clock position to the six o'clock position. The gutters 506, 606 may be grooves in the respective outer race 590, 690 and the bearing housing 592, 692. In some examples, the gutters are separate passages coupled to the respective outer race and the bearing housing.

As mentioned, any of the passages of the lubricant drains of the foregoing disclosure may be interchanged between embodiments. The passages of the lubricant drains may be provided in any combination of axially extending, radially extending, and/or circumferentially extending directions such that drainage of the lubricant from the roller bearing to the sump (e.g., the forward cavity and the aft cavity surrounding the bearing assembly) is permitted. The direction of the passages of the lubricant drains may accommodate constraints within the engine (e.g., the radial constraint of the damper housing), while still permitting removal of the lubricant from the bearing assembly.

Each of the bearing lubricant drains described herein includes a multi-directional passage. That is, the passage extends in more than one radial direction, more than one circumferential direction, more than one axial direction, or a direction that includes a combination of radial, circumferential, and/or axial directions. The multi-directional passage may include any combination of aforementioned multi-directions. For example, the multi-directional passage may extend in more than one radial direction, more than one circumferential direction, more than one axial direction, in a combination of at least one radial direction, at least one circumferential direction, or at least one axial direction, or any combination thereof or any combination of directions.

Furthermore, the slots, grooves, cutouts, holes, passages, etc., described herein that are located within the bearing housing may be referred to as "bearing housing passages" or a "bearing house passage." Likewise, the slots, grooves, cutouts, holes, passages, etc., described herein that are located within the outer race may be referred to as "outer race passages" or an "outer race passage."

Accordingly, the lubricant drains described herein reduce the viscous heat generation and allow draining of lubricant when there is a radial constraint (e.g., due to a squeeze film damper). The lubricant drains of the present disclosure reduce the heat generated by the bearing by about twenty percent to about thirty percent, inclusive of the end points. The lubricant drains of the present disclosure allow for reducing oil supply to the bearings, reducing the heat exchanger sizing, and reducing the supply line sizing, etc., as compared to bearing assemblies without lubricant drains.

Further aspects are provided by the subject matter of the following clauses.

A gas turbine engine comprises a shaft and a bearing assembly. The shaft is configured to rotate about a centerline axis of the gas turbine engine. The bearing assembly is configured to facilitate the rotation of the shaft, the bearing assembly including a bearing, an outer race located radially outward of the bearing and supporting the bearing, a bearing housing located radially outward of the outer race and supporting the bearing and the outer race, and a lubricant drain comprising a multi-directional passage formed in one or both of the outer race and the bearing housing, the lubricant drain arranged to cause a lubricant to flow from a first location to a second location, the second location being radially outward and axially offset from the first location.

The gas turbine engine of the preceding clause, further comprising a damper housing located radially outward of and adjacent to the bearing housing, the damper housing providing a squeeze film damper for the bearing assembly.

The gas turbine engine of any preceding clause, the second location being axially forward of the first location.

The gas turbine engine of any preceding clause, the first location being an inlet to the lubricant drain from the bearing and the second location is a sump.

The gas turbine engine of any preceding clause, the multi-directional passage including a hole formed in the outer race and a passage formed in the outer race, the bearing housing, or both the outer race and the bearing housing.

The gas turbine engine of any preceding clause, the lubricant drain including a hole that extends radially outward and circumferentially outward from a hole inlet to a hole outlet.

The gas turbine engine of any preceding clause, the passage extending axially from the hole to a sump.

The gas turbine engine of any preceding clause, the lubricant drain including a bearing housing passage in the bearing housing and an outer race passage in the outer race.

The gas turbine engine of any preceding clause, the bearing housing passage being formed on an inner surface of the bearing housing.

The gas turbine engine of any preceding clause, the outer race passage being a hole extending from an inner surface of the outer race to an outer surface of the outer race.

The gas turbine engine of any preceding clause, each of the bearing housing and the outer race being unitary, monolithic components.

The gas turbine engine of any preceding clause, the lubricant drain further allowing flow to a third location, the third location being radially outward from and axially aft of the first location.

The gas turbine engine of any preceding clause, the second location being a forward cavity and the third location is a aft cavity.

The gas turbine engine of any preceding clause, the hole outlet being axially forward of the hole inlet.

The gas turbine engine of any preceding clause, the hole outlet and the hole inlet being axially at the same location.

The gas turbine engine of any preceding clause, the outer race passage including a hole and a bearing housing passage includes a groove and a slot.

The gas turbine engine of any preceding clause, a hole outlet of the hole being circumferentially offset from a slot inlet of the slot.

The gas turbine engine of any preceding clause, the groove being an annular groove formed in an inner surface of the bearing housing.

The gas turbine engine of any preceding clause, the slot being an axially extending and circumferentially extending slot formed in an inner surface of the bearing housing.

The gas turbine engine of any preceding clause, the bearing housing passage including a first slot and a second slot, and the outer race passage includes a hole.

The gas turbine engine of any preceding clause, the first slot extending circumferentially outward and axially forward of the hole, and the second slot extends circumferentially outward and axial aft of the hole.

The gas turbine engine of any preceding clause, further comprising a groove formed in an outer surface of the outer race, the groove extending from a hole outlet of the hole to an inlet of the first slot and the second slot.

The gas turbine engine of any preceding clause, an axial width of the first slot and the second slot, together, being equal to an axial width of the outer race.

The gas turbine engine of any preceding clause, further comprising axial cutouts in the bearing housing to allow flow of lubricant to an aft cavity.

The gas turbine engine of any preceding clause, the first slot, the second slot, and the axial cutouts being formed in an inner surface of the bearing housing.

The gas turbine engine of any preceding clause, the lubricant drain including a gutter, a slot, and a hole, each formed in the outer race.

The gas turbine engine of any preceding clause, the gutter and the slot being formed in an outer surface of the outer race.

The gas turbine engine of any preceding clause, the hole extending radially outward and circumferentially outward from a hole inlet to a hole outlet.

The gas turbine engine of any preceding clause, the slot comprising a plurality of discrete slots.

The gas turbine engine of any preceding clause, the gutter having an axial width that increases from a twelve o'clock position to a six o'clock position.

The gas turbine engine of any preceding clause, the slot being located at a six o'clock position.

The gas turbine engine of any preceding clause, the bearing housing passage including a gutter and a slot, and the outer race passage includes a hole.

The gas turbine engine of any preceding clause, the gutter and the slot being each formed on an inner surface of the bearing housing.

The gas turbine engine of any preceding clause, the hole extending radially outward and circumferentially outward from a hole inlet to a hole outlet.

The gas turbine engine of any preceding clause, the slot comprising a plurality of discrete slots.

The gas turbine engine of any preceding clause, the gutter having an axial width that increases from a twelve o'clock position to a six o'clock position.

The gas turbine engine of any preceding clause, the slot being located at a six o'clock position.

A bearing assembly comprises a bearing, an outer race, a bearing housing, and a lubricant drain. The outer race is located radially outward of the bearing and supporting the bearing. The bearing housing is located radially outward of the outer race and supporting the bearing and the outer race. The lubricant drain comprises a multi-directional passage formed in one or both of the outer race and the bearing housing, the lubricant drain arranged to cause a lubricant to flow from a first location to a second location, the second location being radially outward and axially offset from the first location.

The bearing assembly of any preceding clause, further comprising a damper housing located radially outward of and adjacent to the bearing housing, the damper housing providing a squeeze film damper for the bearing assembly.

The bearing assembly of any preceding clause, the second location being axially forward of the first location.

The bearing assembly of any preceding clause, the first location being an inlet to the lubricant drain from the bearing, and the second location is a sump.

The bearing assembly of any preceding clause, the lubricant drain including a hole that extends radially outward and circumferentially outward from a hole inlet to a hole outlet.

The bearing assembly of any preceding clause, the multi-directional passage including a hole formed in the outer race and a passage formed in the outer race, the bearing housing, or both the outer race and the bearing housing.

The bearing assembly of any preceding clause, the passage extending axially from the hole to a sump.

The bearing assembly of any preceding clause, the lubricant drain including a bearing housing passage in the bearing housing and an outer race passage in the outer race.

The bearing assembly of any preceding clause, the bearing housing passage being formed on an inner surface of the bearing housing.

The bearing assembly of any preceding clause, the outer race passage being a hole extending from an inner surface of the outer race to an outer surface of the outer race.

The bearing assembly of any preceding clause, each of the bearing housing and the outer race being unitary, monolithic components.

The bearing assembly of any preceding clause, the lubricant drain further allowing flow to a third location, the third location being radially outward from and axially aft of the first location.

The bearing assembly of any preceding clause, the second location being a forward cavity and the third location is an aft cavity.

The bearing assembly of any preceding clause, the hole outlet being axially forward of the hole inlet.

The bearing assembly of any preceding clause, the hole outlet and the hole inlet being axially at the same location.

The bearing assembly of any preceding clause, the outer race passage including a hole and a bearing housing passage includes a groove and a slot.

The bearing assembly of any preceding clause, a hole outlet of the hole being circumferentially offset from a slot inlet of the slot.

The bearing assembly of any preceding clause, the groove being an annular groove formed in an inner surface of the bearing housing.

The bearing assembly of any preceding clause, the slot being an axially extending and circumferentially extending slot formed in an inner surface of the bearing housing.

The bearing assembly of any preceding clause, the bearing housing passage including a first slot and a second slot, and the outer race passage includes a hole.

The bearing assembly of any preceding clause, the first slot extending circumferentially outward and axially forward of the hole, and the second slot extends circumferentially outward and axial aft of the hole.

The bearing assembly of any preceding clause, further comprising a groove formed in an outer surface of the outer race, the groove extending from a hole outlet of the hole to an inlet of the first slot and the second slot.

The bearing assembly of any preceding clause, an axial width of the first slot and the second slot, together, being equal to an axial width of the outer race.

The bearing assembly of any preceding clause, further comprising axial cutouts in the bearing housing to allow flow of lubricant to an aft cavity.

The bearing assembly of any preceding clause, the first slot, the second slot, and the axial cutouts being formed in an inner surface of the bearing housing.

The bearing assembly of any preceding clause, the lubricant drain including a gutter, a slot, and a hole, each formed in the outer race.

The bearing assembly of any preceding clause, the gutter and the slot being formed in an outer surface of the outer race.

The bearing assembly of any preceding clause, the hole extending radially outward and circumferentially outward from a hole inlet to a hole outlet.

The bearing assembly of any preceding clause, the slot comprising a plurality of discrete slots.

The bearing assembly of any preceding clause, the gutter having an axial width that increases from a twelve o'clock position to a six o'clock position.

The bearing assembly of any preceding clause, the slot being located at a six o'clock position.

The bearing assembly of any preceding clause, the bearing housing passage including a gutter and a slot and the outer race passage includes a hole.

The bearing assembly of any preceding clause, the gutter and the slot being each formed on an inner surface of the bearing housing.

The bearing assembly of any preceding clause, the hole extending radially outward and circumferentially outward from a hole inlet to a hole outlet.

The bearing assembly of any preceding clause, the slot comprising a plurality of discrete slots.

The bearing assembly of any preceding clause, the gutter having an axial width that increases from a twelve o'clock position to a six o'clock position.

The bearing assembly of any preceding clause, the slot being located at a six o'clock position.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A bearing assembly defining a radial direction and an axial direction, the bearing assembly comprising:
   a bearing;
   an outer race located radially outward of the bearing and supporting the bearing;
   a bearing housing located radially outward of the outer race and supporting the bearing and the outer race; and
   a bearing lubricant drain comprising a multi-directional passage formed in one or both of the outer race or the bearing housing, the bearing lubricant drain arranged to cause a lubricant to flow from a first location located at an inner surface of the outer race to a second location located at one of an outermost surface of the outer race or an innermost surface of the bearing housing, wherein the second location is radially outward and axially offset from the first location, and the multi-directional passage including a radially extending portion at the first location that extends parallel to the radial direction and an axially extending portion at the second location that extends parallel to the axial direction, such that the lubricant exits the multi-directional passage in the axial direction at the second location.

2. The bearing assembly of claim 1, further comprising a damper housing located radially outward of and adjacent to the bearing housing, the damper housing providing a squeeze film damper for the bearing assembly.

3. The bearing assembly of claim 1, wherein the second location is axially forward of the first location.

4. The bearing assembly of claim 1, wherein the first location is an inlet to the bearing lubricant drain from the bearing, and the second location is a sump.

5. The bearing assembly of claim 1, wherein the bearing lubricant drain includes a hole that extends radially outward from a hole inlet to a hole outlet and is inclined in a circumferential direction.

6. The bearing assembly of claim 1, wherein the multi-directional passage includes a hole formed in the outer race and a passage formed in the outer race, the bearing housing, or both the outer race and the bearing housing.

7. The bearing assembly of claim 6, wherein the passage extends axially from the hole to a sump.

8. The bearing assembly of claim 1, wherein the bearing lubricant drain includes a bearing housing passage in the bearing housing and an outer race passage in the outer race.

9. The bearing assembly of claim 8, wherein the bearing housing passage is formed on an inner surface of the bearing housing.

10. The bearing assembly of claim 8, wherein the outer race passage is a hole extending from an inner surface of the outer race to an outer surface of the outer race.

11. A gas turbine engine defining a radial direction and an axial direction, the gas turbine engine comprising:
a shaft configured to rotate about a centerline axis of the gas turbine engine; and
a bearing assembly supporting the shaft during rotation of the shaft, the bearing assembly including:
a bearing;
an outer race located radially outward of the bearing and supporting the bearing;
a bearing housing located radially outward of the outer race and supporting the bearing and the outer race; and
a bearing lubricant drain comprising a multi-directional passage formed in one or both of the outer race or the bearing housing, the bearing lubricant drain arranged to cause a lubricant to flow from a first location located at an inner surface of the outer race to a second location located at one of an outermost surface of the outer race or an innermost surface of the bearing housing, wherein the second location is radially outward and axially offset from the first location, and the multi-directional passage including a radially extending portion at the first location that extends parallel to the radial direction and an axially extending portion at the second location that extends parallel to the axial direction, such that the lubricant exits the multi-directional passage in the axial direction at the second location.

12. The gas turbine engine of claim 11, further comprising a damper housing located radially outward of and adjacent to the bearing housing, the damper housing providing a squeeze film damper for the bearing assembly.

13. The gas turbine engine of claim 11, wherein the second location is axially forward of the first location.

14. The gas turbine engine of claim 11, wherein the first location is an inlet to the bearing lubricant drain from the bearing and the second location is a sump.

15. The gas turbine engine of claim 11, wherein the multi-directional passage includes a hole formed in the outer race and a passage formed in the outer race, the bearing housing, or both the outer race and the bearing housing.

16. The gas turbine engine of claim 11, wherein the bearing lubricant drain includes a hole that extends radially outward from a hole inlet to a hole outlet and is inclined in a circumferential direction.

17. The gas turbine engine of claim 16, wherein the multi-directional passage extends axially from the hole to a sump.

18. The gas turbine engine of claim 11, wherein the bearing lubricant drain includes a bearing housing passage in the bearing housing and an outer race passage in the outer race.

19. The gas turbine engine of claim 18, wherein the bearing housing passage is formed on an inner surface of the bearing housing.

20. The gas turbine engine of claim 18, wherein the outer race passage is a hole extending from an inner surface of the outer race to an outer surface of the outer race.

* * * * *